Nov. 27, 1928.

C. PAULY

VAT

Filed Oct. 9, 1925

Inventor:
Charles Pauly

Nov. 27, 1928.  
C. PAULY  
VAT  
Filed Oct. 9, 1925

Inventor!  
Charles Pauly

Patented Nov. 27, 1928.

1,693,249

UNITED STATES PATENT OFFICE.

CHARLES PAULY, OF PORT WASHINGTON, WISCONSIN.

VAT.

Application filed October 9, 1925. Serial No. 61,472.

This invention relates to vats and is an improvement over that disclosed in my co-pending application for vats filed May 14, 1925, Serial No. 30,388.

In general this invention has the same objects as those disclosed in such prior application, namely, to provide means for readily heating or chilling the contents of the vat without employing cumbersome and difficultly cleaned heating coils, but in which a flat open pan may be employed, such pan being devoid of pipes or other projecting parts.

Further objects are to provide a vat with an enclosing jacket or casing through which heating or chilling fluid may be passed and in which the surrounding jacket is formed with a plurality of inwardly opening channels for the circulation of the fluid with the ribs between the channels forming supports for the pan.

It is further a specific object of this invention to provide a very cheap and substantial construction of vat and one in which the heat lost by radiation or conduction is reduced to a minimum.

An embodiment of the invention is shown in the accompanying drawings in which:—

Figure 1:
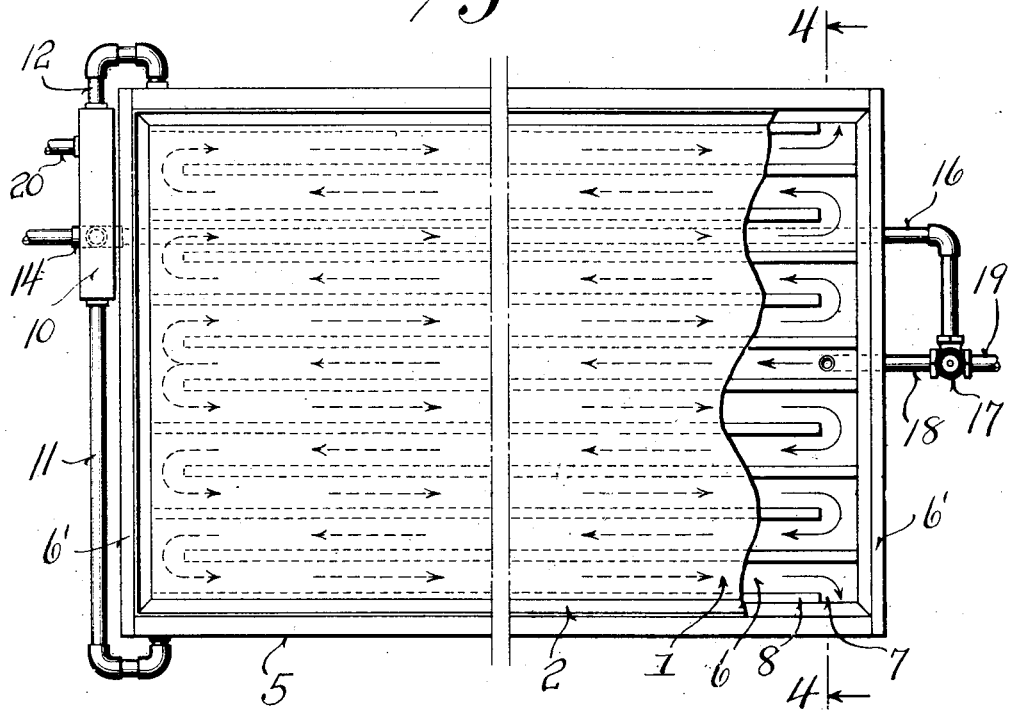
Figure 1 is a plan view of the vat with a portion of the pan broken away.
Figure 2:
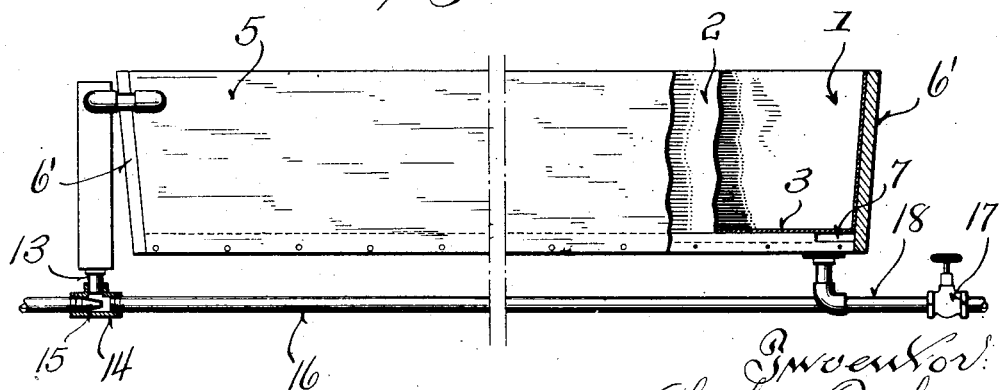
Figure 2 is a side view thereof partly broken away.

Referring to the drawings, it will be seen that the vat comprises a pan 1 of thin sheet metal within which the milk or cheese or similar material is adapted to be held. This pan is provided with slanting side walls 2 and a flat bottom 3.

The jacket is formed of a bottom member 4, side members 5 and end members 6'. This jacket is formed of wood in the preferred construction to provide not only a very cheap and easily formed vat, but also to prevent loss of heat by conduction through the jacket, it being known, of course, that wood is a poor conductor of heat as compared with metal. The side walls and the bottom wall of the jacket are formed in each case with a plurality of longitudinally extending channels 6 formed by means of grooves cut into the wood. It is to be noted that the ribs between the channels 6 stop in an alternate manner short of opposite ends of the vat, as clearly shown in Figure 1, so that liquid entering between the central ribs or into the central channel, as shown in Figure 4, will flow back and forth across the bottom of the vat through the channel.

Figure 4:
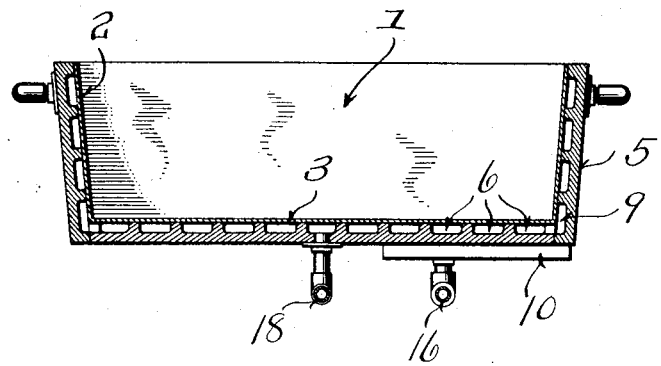
Figure 4 is a transverse sectional view on the line 4—4 of Figure 1.

Further, it is to be noted that due to this construction openings 7 are left at the ends of the side ribs 8, as shown most clearly in Figure 4. These openings communicate with the channels 9 formed in the side walls 5 of the casing and permit the liquid to flow into such channels.

The upper side portions of the casing communicate with a reservoir 10 by means of a pair of pipes 11 and 12, as shown in Figure 1. From this reservoir a short pipe 13 extends downwardly and is the inlet for an injector 14, such injector being provided with a steam nozzle 15. The delivery pipe 16 is in line with the steam nozzle 15 and extends beneath the bottom of the vat. It passes to a threeway valve 17 which, under normal conditions, communicates with a short delivery pipe 18 opening into the central channel of the bottom 4, as shown in Figures 1 and 4. A cold water supply pipe 19 also communicates with the threeway valve 17.

In using the apparatus, assuming that the channels have been filled with water, steam is supplied by the nozzle 15 and heats the water and propels it along the pipe 16, causing the heated water to circulate back and forth across the bottom and sides of the pan 1. It is to be noted that the weight of the pan is distributed very evenly over the ribs in the bottom and side walls and consequently such pan may be made of very thin sheet metal. Further, due to the slanting arrangement of the side walls 2 of the pan and the corresponding slanting arrangement of the side walls 5 of the jacket, the pan will seat against the ribs of the side walls 5 of the jacket and thus form therewith enclosed channels for the side walls as well as the bottom of the vat.

Figure 3:
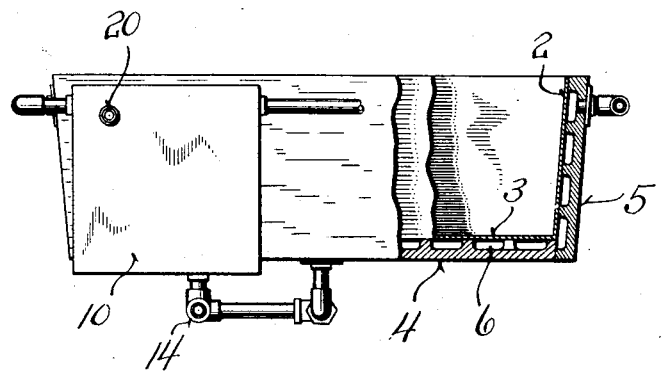
Figure 3 is an end view with a part broken away.

The milk or cheese in the shallow long pan 1 is thus very quickly brought to the desired temperature as a very extensive area is exposed to the heating medium. After the desired heating treatment has been effected, the steam may be shut off and if it is desired to quickly chill the contents of the pan, the threeway valve 17 may be turned to admit cold water. This cold water displaces the heated water and rapidly chills the contents of the pan. It is, of course, intended that an overflow be provided at a suitable point for instance as indicated at 20 in Figure 3. Thus means are provided for the discharge of the entering water during chilling and also for the discharge of the water of condensation from the steam which is added during the heating process to the water already in circulation.

The reservoir 10 provides a place for the accumulation of liquid and acts as a temporary storage compartment discharging directly downwardly into the injector 14. Thus, it is impossible to entrain air into the circulating system as the reservoir 10 is at all times during normal operation filled with water.

It will be seen that an extremely cheap and effective form of heating or cooling vat has been provided as it is apparent that the wood may be very readily channeled out to provide the circulation path described in detail above.

Although the invention has been described in considerable detail, it is to be understood that the invention may be variously embodied and is, therefore, to be limited only as claimed.

I claim:

A vat comprising an outer jacket formed of wood and having a plurality of longitudinally extending channels in its side and bottom walls, said channels being open towards the interior of said jacket and communicating with each other at alternately opposite ends and forming between themselves inwardly projecting tongues, said side walls being slanted outwardly, and a sheet metal pan having slanting side walls and a flat bottom and adapted for positioning within said jacket, said bottom resting directly upon the bottom tongues formed between the bottom channels, and said sides wedging against the side tongues formed by the side channels, said jacket having inlet and outlet apertures communicating with said channels at opposite ends of the vat.

In testimony that I claim the foregoing I have hereunto set my hand at Manitowoc, in the county of Manitowoc and State of Wisconsin.

CHARLES PAULY.